UNITED STATES PATENT OFFICE.

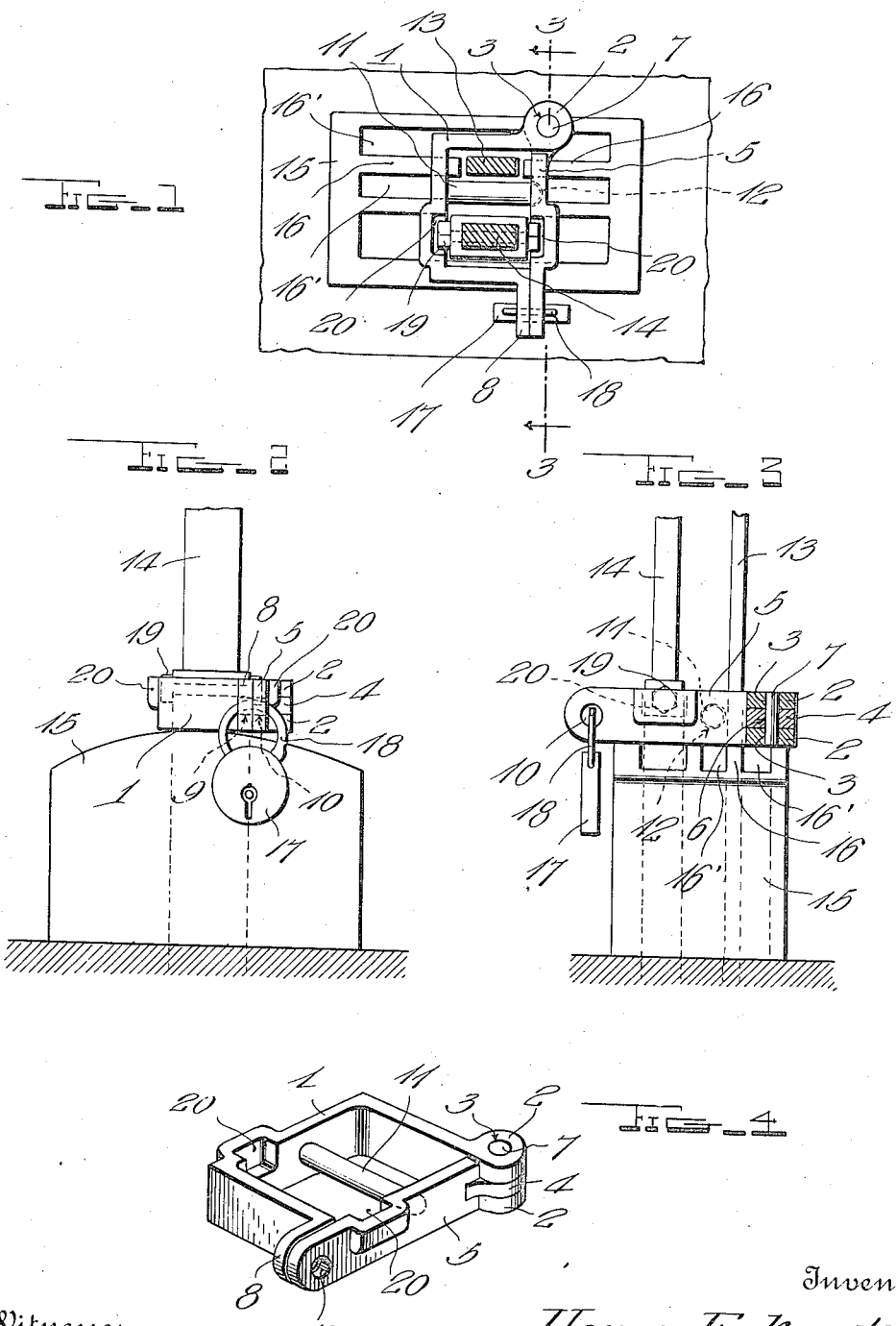

HENRY ECKART, OF FORT WAYNE, INDIANA.

GEAR-SHIFTING-LEVER LOCK.

1,181,378.　　　　Specification of Letters Patent.　　Patented May 2, 1916.

Application filed January 17, 1916. Serial No. 72,603.

*To all whom it may concern:*

Be it known that I, HENRY ECKART, a citizen of the United States, residing at Fort Wayne, in the county of Allen and State of Indiana, have invented certain new and useful Improvements in Gear-Shifting-Lever Locks; and I do declare the following to be a full, clear, and exact description of the invention, such as will enable others skilled in the art to which it appertains to make and use the same.

This invention relates to locks for automobiles and other motor vehicles having controlling levers, so that the owner may leave his machine standing in public without fear of it being stolen or injured by an unexperienced person attempting to operate the machine by moving the levers.

The object of the invention is to provide a device of this character which is simple, strong and durable in construction, inexpensive to manufacture, efficient and reliable in operation, and well adapted to the purpose for which it is designed.

With this and other objects in view the invention consists of certain novel features of construction, and the combination and arrangement of parts as will be hereinafter fully described and claimed.

In the accompanying drawings in which similar reference numerals designate like parts throughout the several views, Figure 1 is a plan view of a device constructed in accordance with the invention showing it applied to the gear and brake levers of an automobile; Fig. 2 is a side elevation of the same; Fig. 3 is a sectional view taken on the line 3—3 of Fig. 1; and Fig. 4 is a perspective view of the device.

The preferred form of the present invention consists of a U-shaped member 1, the free end of one side of which is bifurcated to form spaced lugs 2, the latter being provided with alined transverse apertures 3. Disposed between the lugs 2 is the reduced end 4 of a strap member 5, said reduced end 4 being provided with a transversely extending aperture 6 which is disposed in alinement with the aforesaid aperture 3 to receive a pivot pin 7 whereby said strap member 5 is hinged to the U-shaped member 1. The other side of the U-shaped member 1 is bent laterally and outwardly to form a flange 8, said flange 8 being rounded at its free end to conform in shape to the free end of the strap member 5 when the latter is swung across the open end of said U-shaped member 1. The flange 8 and free end of the strap member 5 are provided with apertures 9 and 10 respectively which are so positioned as to be in alinement when said strap member is in the position above mentioned.

Extending inwardly from their inner face of the end of the U-shaped member 1 is a cylindrical lug 11, said lug 11 being integral with said member 1 and arranged in a plane parallel to the sides of the latter and spaced therefrom. The free end of this lug 11 is received in a recess 12 arranged on the inner face of the strap member 5, when said strap member is in its closed position, as herein before described.

The device is designed to be used in connection with the gear shifting lever 13 and brake lever 14 of an automobile or other motor vehicle in which the gear shifting lever 13 works in a slotted plate 15, the lever 13 being at its neutral position when it is disposed between the longitudinally extending tongues 16 which separates the longitudinally extending slots 16.′ With the levers 13 and 14 in their neutral positions in which they are disposed substantially parallel, the device is applied, said levers being received in the U-shaped member 1, one on each side of the aforesaid lug 11 which, as will be understood, acts in the capacity of a spacing member to prevent said levers from shifting relative to each other. The strap member 5 is then moved to its closed position and locked by a padlock 17, the shackle 18 of which extends through the apertures 9 and 10.

To prevent the device from shifting longitudinally on the levers 13 and 14, its lower edge is disposed in contact with the plate 15 while its upper edge is disposed beneath suitable stop members 19 carried by one of the levers, here shown as a brake lever 14. These stops 19 are received in recesses 20 formed in the inner faces of the strap member 5 and end of the U-shaped member 1 at the upper edges thereof, whereby to prevent unauthorized removal of the same.

From the foregoing description, taken in connection with the accompanying drawings, the operation and advantages of the invention will be fully understood without a more extended explanation.

It is to be understood that various minor changes in form and proportion may be resorted to without departing from the spirit of this invention and hence I do not wish to limit myself to the construction herein shown and described other than that set forth in the appended claim.

I claim:—

A lock of the class described comprising a substantially U-shaped member adapted to surround the gear shifting and the brake levers of a motor vehicle when said levers are in their respective neutral positions, a strap member hinged at one end to the free end of one of the sides of said U-shaped member and having an aperture at the other end thereof, a flange extending laterally from the free end of the other side of said U-shaped member and having an aperture therein adapted to be alined with the first mentioned aperture when said strap member is swung across the opening between the sides of said U-shaped member, said strap and said U-shaped members being provided with alined recesses adapted to receive stop members carried by one of said levers, and a cylindrical shank secured to said U-shaped member and disposed intermediate of the sides thereof for holding said levers apart.

In testimony whereof I have hereunto set my hand in presence of two subscribing witnesses.

HENRY ECKART.

Witnesses:
 EDWARD A. WALKER,
 J. W. LIPKEY.